(12) United States Patent
Matsuda

(10) Patent No.: US 12,009,474 B2
(45) Date of Patent: Jun. 11, 2024

(54) ELECTROLYTE FOR LITHIUM AIR BATTERIES, AND A LITHIUM AIR BATTERY USING THE SAME

(71) Applicant: NATIONAL INSTITUTE FOR MATERIALS SCIENCE, Tsukuba (JP)

(72) Inventor: Shoichi Matsuda, Tsukuba (JP)

(73) Assignee: NATIONAL INSTITUTE FOR MATERIALS SCIENCE, Tsukuba (JP)

( * ) Notice: Subject to any disclaimer, the term of this patent is extended or adjusted under 35 U.S.C. 154(b) by 682 days.

(21) Appl. No.: 17/266,353

(22) PCT Filed: Aug. 16, 2019

(86) PCT No.: PCT/JP2019/032164
§ 371 (c)(1),
(2) Date: Feb. 5, 2021

(87) PCT Pub. No.: WO2020/049982
PCT Pub. Date: Mar. 12, 2020

(65) Prior Publication Data
US 2021/0313615 A1    Oct. 7, 2021

(30) Foreign Application Priority Data
Sep. 4, 2018   (JP) ................. 2018-165103

(51) Int. Cl.
*H01M 10/056* (2010.01)
*H01M 12/08* (2006.01)
(52) U.S. Cl.
CPC ......... *H01M 10/056* (2013.01); *H01M 12/08* (2013.01); *H01M 2300/0028* (2013.01)

(58) Field of Classification Search
CPC ............... H01M 10/056; H01M 12/08; H01M 2300/0028
See application file for complete search history.

(56) References Cited

U.S. PATENT DOCUMENTS

| 2006/0216613 | A1 | 9/2006 | Wang et al. | |
| 2011/0143218 | A1* | 6/2011 | Issaev | H01M 6/164 |
| | | | | 429/333 |

(Continued)

FOREIGN PATENT DOCUMENTS

| CN | 1860639 A | 11/2006 |
| CN | 103370830 A | 10/2013 |

(Continued)

OTHER PUBLICATIONS

KR 101748400 MT (Year: 2017).*

(Continued)

*Primary Examiner* — Alexander Usyatinsky
(74) *Attorney, Agent, or Firm* — HAUPTMAN HAM, LLP

(57) ABSTRACT

The invention relates to an electrolyte capable of improving the energy efficiency of a lithium air battery, and a lithium air battery using the electrolyte. An electrolyte for lithium air batteries according to the invention includes an amide-based organic solvent and lithium nitrate, wherein the concentration of lithium nitrate in the amide-based organic solvent satisfies a range of no less than 2 mol/L to no greater than 5.5 mol/L. A lithium air battery according to the invention includes an air electrode, a negative electrode including a lithium metal, and an electrolyte located between the air electrode and the negative electrode, wherein the electrolyte is provided by the aforesaid electrolyte.

4 Claims, 8 Drawing Sheets

(56) References Cited

U.S. PATENT DOCUMENTS

| | | |
|---|---|---|
| 2012/0270116 A1 | 10/2012 | Cho et al. |
| 2014/0004429 A1 | 1/2014 | Nakanishi |
| 2014/0017577 A1 | 1/2014 | Minami et al. |
| 2014/0079989 A1* | 3/2014 | Janakiraman ....... H01M 10/052 429/188 |
| 2014/0212772 A1 | 7/2014 | Nakamoto et al. |
| 2015/0072247 A1* | 3/2015 | Cho ................. H01M 10/0567 429/188 |
| 2016/0172711 A1* | 6/2016 | Yang .................. H01M 10/052 429/332 |
| 2018/0069230 A1* | 3/2018 | Lee ....................... H01G 11/32 |
| 2018/0269529 A1 | 9/2018 | Yuyama |

FOREIGN PATENT DOCUMENTS

| | | | |
|---|---|---|---|
| CN | 103531866 | A | 1/2014 |
| CN | 103545535 | A | 1/2014 |
| CN | 103843191 | A | 6/2014 |
| CN | 104205480 | A | 12/2014 |
| CN | 106654465 | A | 5/2017 |
| CN | 106785050 | A | 5/2017 |
| CN | 107112592 | A | 8/2017 |
| CN | 108110385 | A | 6/2018 |
| CN | 108140888 | A | 6/2018 |
| JP | 2012-138329 | A | 7/2012 |
| JP | 2012-227119 | A | 11/2012 |
| JP | 2017-178859 | A | 10/2017 |
| JP | 2017-208291 | A | 11/2017 |
| JP | 2018-514900 | A | 6/2018 |
| JP | 2018-120854 | A | 8/2018 |
| KR | 10-2016-0107545 | A | 9/2016 |
| KR | 10-2017-0027141 | A | 3/2017 |
| KR | 101739524 | * | 5/2017 |
| KR | 101748400 | B1 * | 6/2017 |

OTHER PUBLICATIONS

Walker et. al. J.Amer. Chem. Soc.,2013,p. 2076, supporting information. (Year: 2013).*
Walker et. al. J.Amer. Chem. Soc.,2013,p. 2076, (Year: 2013).*
KR101739524MT (Year: 2017).*
The Decision to grant a Patent published by JPO (Year: 2024).*
The Notification to grant a Patent published by SIPO (Year: 2024).*
PCT/ISA/210, "International Search Report for International Application No. PCT/JP2019/032164," Oct. 29, 2019.
Walker, W. et al., "A Rechargeable Li—O_2_ Battery Using a Lithium Nitrate/N,N-Dimethylacetamide Electrolyte," Journal of the American Chemical Society, Jan. 29, 2013, p. 2076-2079, vol. 135, ACS Publications.
China National Intellectual Property Administration, "Office Action with Search Report for Chinese Patent Application 201980055492. 5", Aug. 30, 2023.

* cited by examiner

ELECTROLYTE FOR LITHIUM AIR BATTERIES, AND A LITHIUM AIR BATTERY USING THE SAME

RELATED APPLICATIONS

The present application is National Phase of International Application No. PCT/JP2019/032164 filed on Aug. 16, 2019, and claims priority of Japanese Patent Application No. 2018-165103 filed Sep. 4, 2018, the disclosures of which are hereby incorporated by reference herein in its entirety.

FIELD OF THE INVENTION

The present invention relates to an electrolyte for lithium air batteries, and a lithium air battery using the same.

BACKGROUND ART

An air battery comprises an air electrode, a metal negative electrode comprising a metal foil or metal fine particles, and a liquid or solid electrolyte, wherein air or oxygen gas flowing through a flow channel provided through the air battery is used as a positive electrode active substance, and the metal foil or metal fine particles are used as a negative electrode active substance.

A plurality of air battery technologies have been proposed in the art, and in recent year, lithium air batteries in particular have been researched and developed more vigorously. This is because they are not only formed into a secondary battery capable of being charged for repeated use, but are also much more improved in terms of energy density per unit weight than practically used lithium ion batteries. However, a problem with the lithium air battery is that its energy efficiency remains low because charge voltage is higher than discharge voltage.

With the aforesaid problem in mind, for instance, a metal air battery using a water-soluble electrolyte and an organic electrolyte is under development (see Patent Publication 1 as an example). The air battery according to Patent Publication 1 is characterized in that an organic electrolyte is used on a metal negative electrode side, a water-soluble electrolyte is used on an air electrode side, and a solid separation membrane capable of passing only metal ions of the negative electrode is located between the organic electrolyte on the metal negative electrode side and the water-soluble electrolyte on the air electrode side. Such an assembly ensures that high capacity is obtained while avoiding any lowering of charge-discharge efficiency. However, there is still mounting demand for technology capable of enhancing the energy efficiency of an air battery by means of simpler arrangement.

For the purpose of providing a solution to the aforesaid problem, for instance, there is development of an air battery using an electrolyte having Na ions or Cs ions added thereto as an example (see Patent Publication 2 as an example). Patent Publication 2 discloses an electrolyte including a supporting salt such as hexafluorophosphate salt ($LiPF_6$), perchlorate salt ($LiClO_4$), tetrafluoroborate salt ($LiBF_4$), pentafluoro-arsinate salt ($LiAsF_5$), bis(trifluoromethanesulfonyl) imide salt ($Li(C_2F_3SO_2)_2N$), bis-(pentafluoroethanesulfonyl) imide salt ($LiN(C_2F_5SO_2)_2$), trifluoromethanesulfonate salt ($Li(CF_3SO_3)$), nonafluorobutanesulfonate salt ($Li(C_4F_9SO_3)$), an organic solvent such as trimethyl phosphate, triphenyl phosphate, sulfolane and dimethylsulfoxide, and at least one additive ion selected from Cs ions and Na ions. It is here noted that the supporting salt has a concentration of no less than 0.1 mol/L to no greater than 2.0 mol/L, and the ions added to the supporting salt are contained in a molar ratio of no less than 0.10 to no greater than 0.50. The generation of highly reactive radicals can be prevented by the shielding effect of Cs ions or Na ions having a large ionic radius, resulting in enhanced charge/discharge efficiency. For practical applications, however, there is mounting demand identified for far more enhanced energy efficiency.

PRIOR ARTS

Patent Publications

Patent Publication 1: JP (A) 2012-227119
Patent Publication 2: JP (A) 2012-138329

SUMMARY OF THE INVENTION

Object of the Invention

Therefore, the present invention has for its object to provide an electrolyte adapted to improve the energy efficiency of a lithium air battery, and a lithium air battery using the same.

EMBODIMENTS OF THE INVENTION

The aforesaid object of the invention is achieved by the provision of an electrolyte for lithium air batteries, which contains an amide-based organic solvent and lithium nitrate, wherein the concentration of said lithium nitrate in said amide-based organic solvent satisfies a range of no less than 2 mol/L to no greater than 5.5 mol/L.

The concentration of said lithium nitrate in said amide-based organic solvent may satisfy a range of no less than 2.5 mol/L to no greater than 5 mol/L. The concentration of said lithium nitrate in said amide-based organic solvent may satisfy a range of no less than 3 mol/L to no greater than 5 mol/L.

The aforesaid amide-based organic solvent may be at least one selected from the group consisting of amide-based organic solvents represented by the following chemical formula (1) or (2).

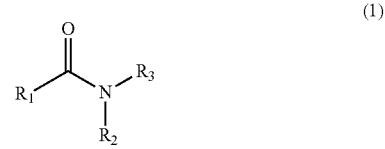

(1)

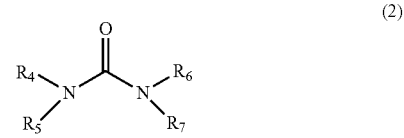

(2)

where $R_1$ to $R_7$ stand independently for a hydrogen atom, a halogen atom, an alkyl group having 1 to 20 carbon atoms, an alkenyl group having 2 to 20 carbon atoms, and an aryl group having 6 to 20 carbon atoms.

The aforesaid amide-based organic solvent may be at least one selected from the group consisting of N, N-dimethylacetamide, N, N-dimethylformamide, N, N-diethylformamide, N, N-dimethylpropionamide, N, N-diethyl-propionamide, N, N-dimethylbutylamide, and N, N-diethylacetamide.

The aforesaid amide-based organic solvent may be N, N-diethylformamide and/or N, N-dimethylpropionamide.

The aforesaid electrolyte may contain water in an amount of 100 ppm or less.

The aforesaid electrolyte may have a viscosity of no less than 0.1 Pa's to no greater than 10 Pa's.

The aforesaid electrolyte may further contain an organic material selected from the group consisting of an aromatic hydrocarbon, an alkyl halide, and a halogenated ether.

The aforesaid organic material may be contained in the aforesaid amide-based organic solvent in an amount of no less than 1% by volume to no greater than 70% by volume.

The aforesaid object of the invention is achievable by the provision of a lithium air battery comprising an air electrode, a metal negative electrode comprising a lithium metal, and a non-aqueous electrolyte positioned between said air electrode and said metal negative electrode, wherein the aforesaid non-aqueous electrolyte is provided by the aforesaid electrolyte.

There may be a separator provided between the aforesaid air electrode and said metal negative electrode, the aforesaid non-aqueous electrolyte provided between the aforesaid metal negative electrode and the aforesaid separator, and the aforesaid non-aqueous electrolyte or an aqueous electrolyte provided between the aforesaid air electrode and the aforesaid separator.

Advantages of the Invention

The inventive electrolyte for lithium air batteries contains an amide-based organic solvent, and lithium nitrate. The concentration of lithium nitrate in the amide-based organic solvent is adjusted in such a way as to satisfy the range of no less that 2 mol/L to no greater than 5.5 mol/L. The present inventors have selected an amide-based organic solvent and lithium nitrate from numerous organic solvents and supporting salts for use of an electrolyte adjusted to the aforesaid given concentration range thereby finding that the energy efficiency of a lithium air battery is enhanced in a high concentration range of the supporting salt in particular. Energy efficiency is enhanced by the simple means comprising selection of a given organic solvent and supporting salt and adjustment of the electrolyte's concentration thereby having the advantage of rendering packaging of lithium air batteries easy.

MODES FOR CARRYING OUT THE INVENTION

Figure 1:
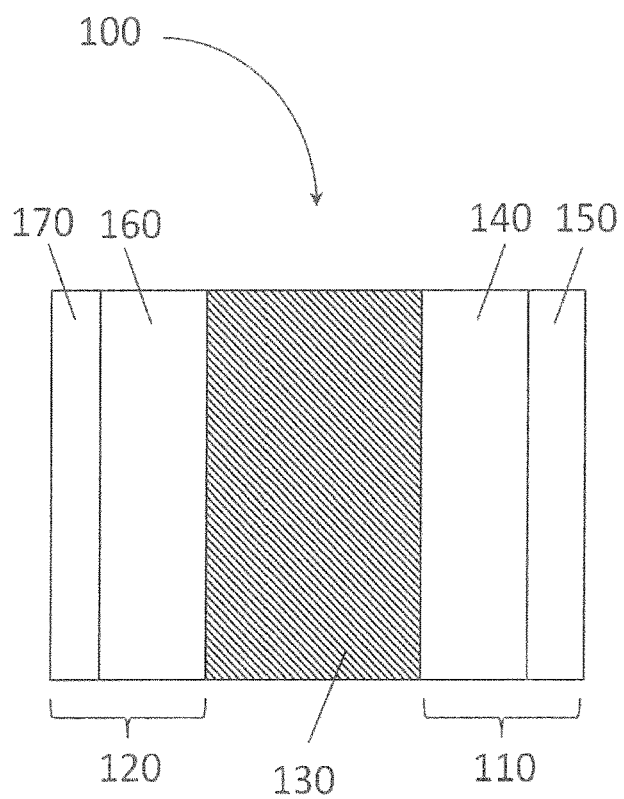
FIG. 1 is a schematic view of the arrangement or assembly of one lithium air battery according to the invention.

Modes for carrying out the invention will now be explained with reference to the accompanying drawings. It is noted that there is no explanation of like elements indicated by like numeral references.

Mode 1

Mode 1 is provided to explain the inventive electrolyte for lithium air batteries and a process for producing the same.

The present inventors have focused on the use, as an electrolyte for lithium air batteries, of a water-free or non-aqueous electrolyte used in combination with an amide-based organic solvent as an organic solvent. It has been found that the energy efficiency of a lithium air battery can be enhanced or improved by proper selection of a lithium salt used in combination with this organic solvent and adjustment of its concentration within a proper range.

The inventive aqueous solution for lithium air batteries contains an amide-based organic solvent and lithium nitrate. It is here noted that the concentration of lithium nitrate in the amide-based organic solvent is adjusted in such a way as to satisfy a range of no less than 2 mol/L to no greater than 5.5 mol/L. As the lithium nitrate concentration is less than 2 mol/L, it often causes the energy efficiency of a lithium air battery to be not fully enhanced, and as the lithium nitrate concentration is higher than 5.5 mol/L, it causes lithium nitrate to be not dissolved.

Lithium nitrate, because of being lower in the degree of dissociation relative to an organic solvent among lithium salts, is usually used in an aqueous electrolyte, and even when lithium nitrate is used in a non-aqueous electrolyte, it is often utilized in a concentration of about 1 mol/L. This is due to common knowledge that the conductivity of lithium would reach a maximum in said concentration. From various experiments, however, the present inventors have found that lithium nitrate can be dissolved in an amide-based organic solvent without recourse to water yet with high concentrations, resulting successfully in enhancement of the energy efficiency of lithium air batteries.

The concentration of lithium nitrate is preferably within the range of no less than 2.5 mol/L to no greater than 5 mol/L, in which the energy efficiency of lithium air batteries can be enhanced in an effective manner. Most preferably, the concentration of lithium nitrate is within the range of no less than 3 mol/L to no greater than 5 mol/L, in which the energy efficiency of lithium air batteries can be enhanced in a more effective manner.

The amide-based organic solvent used herein may be any desired solvent with the proviso that it could normally be used for an electrolyte suitable for lithium air batteries and having one or more amide bonds. The amide-based organic solvent is preferably one or more selected from the group consisting of amide-based organic solvents represented by chemical formula (1) or (2). The amide-based organic solvent represented by chemical formula (1) are carboxylic amides, and the amide-based organic solvent represented by chemical formula (2) is of urea classes. Lithium nitrate could be sufficiently dissociated in the presence of these amide-based organic solvents.

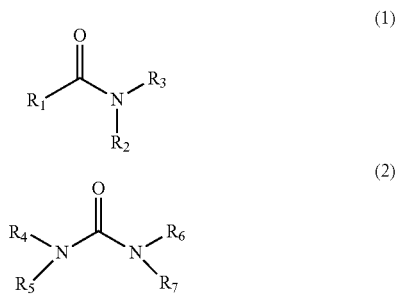

Referring here to chemical formulae (1) and (2), $R_1$ to $R_7$ stand independently for a hydrogen atom, a halogen atom, an alkyl group having 1 to 20 carbon atoms, an alkenyl group having 2 to 20 carbon atoms, and an aryl group having 6 to 20 carbon atoms. When $R_1$ to $R_7$ contain a carbon atom(s), there is preferably the mention of an alkyl group having 1 to 8 carbon atoms, an alkenyl group having 2 to 8 carbon atoms, or an aryl group having 6 to 8 carbon atoms. If the number of carbon atoms is 8 or less, there could be higher energy efficiency obtained because the electrolyte has a low viscosity.

It is more preferable that the amide-based organic solvent is at least one selected from the group consisting of N, N-dimethylacetamide, N, N-dimethyl-formamide, N, N-diethylformamide, N, N-dimethylpropionamide, N, N-diethylpropionamide, N, N-dimethylbutylamide, and N, N-diethylacetamide. These amide-based organic solvents allow for satisfactory dissociation of lithium nitrate and easy adjustment to the aforesaid lithium nitrate concentration. Most preferably, the amide-based organic solvent is N, N-diethylformamide and/or N, N-dimethyl-propionamide.

The inventive electrolyte does not contain water, but water inclusive of adsorbed water is controlled in an amount of 100 ppm or lower. Within such a range, the oxidation of the metal electrode can be held back when the inventive electrolyte is used with a lithium air battery. More preferably, water in the electrolyte is controlled to 50 ppm or lower.

While the inventive electrolyte contains lithium nitrate in high concentrations, it has preferably a viscosity in the range of no less than 0.1 Pa·s to not greater than 10 Pa·s. Adjustment of viscosity within this range can lead to improvements in energy efficiency. More preferably, the inventive electrolyte has a viscosity in the range of no less than 0.5 Pa·s to no greater than 2 Pa·s. It is here noted that while the viscosity of the electrolyte may be measured by a viscometer, it is understood that if the electrolyte is visually found to have fluidity, it means that the electrolyte may be judged as having a viscosity of no less than 0.1 Pa·s to no greater than 10 Pa·s.

The inventive electrolyte may further contain an organic material selected from the group consisting of an aromatic hydrocarbon, an alkyl halide, and a halogenated ether. If these organic materials are added to the electrolyte, it is then possible to adjust its viscosity without having any significant influence on the characteristic features of the electrolyte.

The aforesaid organic material (s) is preferably contained in the amide-based organic solvent in an amount of no less than 1% by volume to no greater than 70% by volume for viscosity adjustment. More preferably, the organic material (s) is contained in the amide-based organic solvent in an amount of no less than 5% by volume to no greater than 20% by volume, leading to enhanced energy efficiency under viscosity adjustment. Most preferably, the organic material (s) is contained in an amount of no less than 5% by volume to no greater than 10% by volume.

The process of producing the inventive electrolyte will now be explained.

The electrolyte according to the invention may be produced by mixing the amide-based organic solvent with lithium nitrate in such a way as to satisfy the aforesaid molar concentration. It is here noted that they may be mixed not only by manual means but also by an agitator such as a stirrer or propeller, resulting in accelerated dissolution. Alternatively, the mixture may be heated to not lower than 40° C. to not higher than 80° C. during mixing. It is here noted that if any dispersing lithium nitrate is not visually observed, it means that it is in complete dissolution.

Lithium nitrate, because of having deliquescence, is preferably weighed and mixed in a glove box for the purpose of preventing adsorption of water. In addition, lithium nitrate may be dehydrated by vacuum drying prior to mixing whereby the amount of adsorbed water can be controlled to 100 ppm or lower. Furthermore, the amide-based organic solvent may be pre-dehydrated by a molecular sieve.

It is here noted that upon mixing, the mixture may further contain an organic material selected from the group consisting of an aromatic hydrocarbon, an alkyl halide, and a halogenated ether. This allows for control of the resulting electrolyte's viscosity to the range of no less than 0.1 Pa's to no greater than 10 Pa·s. The organic material may be mixed with the amide-based organic solvent in an amount of preferably no less than 1% by volume to no greater than 70% by volume, more preferably no less than 5% by volume to no greater than 20% by volume, and most preferably no less than 5% by volume to no greater than 10% by volume as described above.

Thus, the inventive electrolyte is obtained simply by mixing of the raw materials without recourse to any special equipment or any special technique; it is easily practiced.

Mode 2

With reference to Mode 2, the lithium air battery using the electrolyte explained in Mode 1 will now be explained.

FIG. 1 is a schematic view of one exemplary arrangement of the inventive lithium air battery.

The inventive lithium air battery, generally indicated by 100, comprises an air electrode 110, a metal negative electrode 120 having a lithium metal, and an electrolyte 130 positioned between the air electrode 110 and the metal negative electrode 120. It is here noted that the electrolyte 130 will not be explained anymore because of being the one explained in Mode 1. The lithium air battery of the invention is enhanced in terms of energy efficiency because of incorporating the electrolyte explained in Mode 1.

The air electrode 110 comprises a positive electrode reaction layer 140 and a positive electrode collector 150 contiguous thereto. The positive electrode reaction layer 140 contains a porous carbon material as a main ingredient, but may further contain a catalyst, a binder, an electrically conductive aid or the like as needed. Typically, the porous carbon material includes mesoporous carbon, graphene, carbon black, acetylene black, carbon nanotubes, carbon nanofibers, and carbon nanohorns. The positive electrode collector 150 is formed of a porous, electrically conductive metal material, carbon or the like, and may have an externally connected terminal (not shown). Materials well-known in the art may be used for the catalyst, binder and conductive aid.

The metal negative electrode 120 comprises a negative electrode active substance layer 160 containing a lithium metal, and a negative electrode collector 170 contiguous thereto. The lithium metal contained in the negative electrode active substance layer 160 may be formed of metallic lithium alone or a lithium alloy. By way of example but not by way of limitation, the element that forms a lithium alloy with lithium includes magnesium, titanium, tin, lead, aluminum, indium, silicon, zinc, antimony, bismuth, gallium, germanium, and yttrium. As is the case with the positive electrode collector 150, the negative electrode collector 170 is composed of an electrically conductive material, carbon or the like, and may have an externally connected terminal (not shown). Alternatively, the negative electrode active substance layer 160 and negative electrode collector 170 may have a unitary structure as an example.

The inventive lithium air battery 100 operates under much the same principles as an existing one, but it could induce dramatic enhancement of energy efficiency by use of the electrolyte 130 explained with reference to Mode 1.

Although not illustrated, a separator (not shown) unlikely to react with the electrolyte may be immersed in the electrolyte 130 and located between the air electrode 110 and the metal negative electrode 120. Materials well-known in the art may be used for such a separator.

Figure 2:
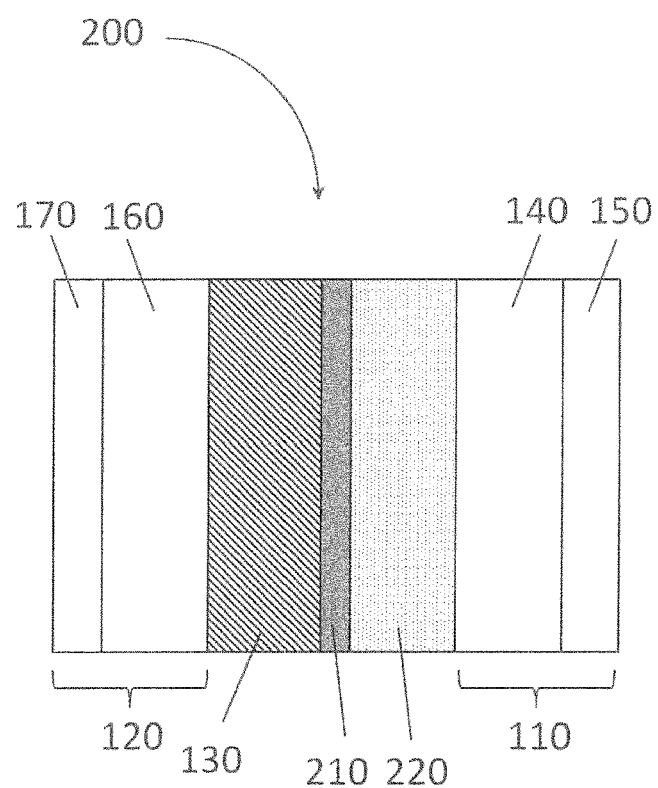
FIG. 2 is a schematic view of the arrangement of another lithium air battery according to the invention.

FIG. 2 is a schematic view of another assembly of the lithium air battery disclosed herein.

A lithium air battery generally shown at 200 in FIG. 2 is similar to the lithium air battery 100 of FIG. 1 except that a separator 210 capable of lithium ion conduction is provided between an air electrode 110 and a metal negative electrode 120 and an electrolyte 220 is provided between the separator 210 and the air electrode 110.

It is here noted that the separator 210 is formed of any desired material capable of lithium ion conduction, but impervious to a liquid such as water. For instance, various materials referred to as a separation membrane in Patent Publication 1 may be used. The electrolyte 220 may be either the one explained in Mode 1 or an aqueous one. An aqueous electrolyte ordinarily used with lithium air batteries may be used for this aqueous electrolyte; the aqueous electrolyte referred to in Patent Publication 1 may be used as an example. Such a structure ensures that the electrolyte between the air electrode 110 and the metal negative electrode 120 is so unlikely to be mixed that battery reaction is more activated, leading to high capacity batteries.

The lithium air batteries 100 and 200 assembled as shown in FIGS. 1 and 2 may each be housed or laminated in a container formed of a laminated film comprising a thermoplastic resin or the like, as would be obvious to those skilled in the art.

The present invention is directed to a lithium air battery; however, the inventive electrolyte may be applied to metal air batteries other than lithium air batteries, such as secondary batteries, and fuelcells.

Although the present invention will now be explained in further details with reference to some specific examples, it is understood that the present invention is not limited thereto.

EXAMPLES

Examples 1 to 12

In Examples 1 to 12, electrolytes containing various amide-based organic solvents and various lithium salts were prepared to produce lithium air batteries (coin cells) whose electrochemical characteristics were estimated, as detailed below.

N, N-diethylformamide and N, N-dimethylpropionamide were purchased as the amide-based organic solvents from Tokyo Chemical Industry Co., Ltd. The organic solvents were dehydrated by a molecular sieve as required.

Lithium nitrate (made by Sigma-Aldrich Japan), lithium bis(fluorosulfonyl) imide (LiFSI made by Kishida Chemical Co., Ltd.) and lithium tetrafluoroborate ($LiBF_4$ made by Kishida Chemical Co., Ltd.) were used as the lithium salt. The lithium salts were dehydrated by vacuum drying as required.

Various amide-based organic solvents (2 mL) and various lithium salts were weighed and mixed together in globe box such that the concentrations tabulated in Table 1 were satisfied, after which they were agitated at room temperature (25° C.) using a magnetic stirrer. It has been observed that the lithium salts are dissolved in all the electrolytes obtained in Examples 1 to 12 without being precipitated and dispersed. The obtained electrolytes have also been found to have a water content of 100 ppm or less as measured by a Karl Fischer moisture measuring device. From the fact that the electrolytes were visually observed to have fluidity, the viscosity of each electrolyte was judged as coming within the range of no less than 0.1 Pa's to no greater than 10 Pa·s.

TABLE 1

Listing of the Electrolytes of Examples 1 to 12

| | | Supporting Salts | |
|---|---|---|---|
| Ex. | Amide-Based Organic Solvents | Types | Conc. (mol/L) |
| 1 | N, N-diethylformamide | $LiNO_3$ | 1 |
| 2 | N, N-diethylformamide | $LiNO_3$ | 3 |
| 3 | N, N-diethylformamide | $LiNO_3$ | 5 |
| 4 | N, N-diethylformamide | LiFSI | 1 |
| 5 | N, N-diethylformamide | LiSFI | 5 |
| 6 | N, N-dimethylpropionamide | $LiNO_3$ | 1 |
| 7 | N, N-dimethylpropionamide | $LiNO_3$ | 3 |
| 8 | N, N-dimethylpropionamide | $LiNO_3$ | 5 |
| 9 | N, N-dimethylpropionamide | LiFSI | 1 |
| 10 | N, N-dimethylpropionamide | LiFSI | 5 |
| 11 | N, N-dimethylpropionamide | $LiBF_4$ | 1 |
| 12 | N, N-dimethylpropionamide | $LiBF_4$ | 5 |

Then, the electrolytes of Examples 1 to 12 were used to produce CR2032 model coin cells as lithium air batteries. Carbon black, i.e., Ketjen Black (registered trademark) (EC600JD made by Lion Speciality Chemicals Co., Ltd.) was used for the air electrode, and a lithium metal foil (ϕ16 mm) was used for the metal negative electrode. More specifically, 0.105 gram of Ketjen Black, 0.090 gram of an aqueous solution of 5 wt % polyvinyl pyrrolidone (K90 made by FUJIFILM Wako Pure Chemical Corporation) acting as a dispersant and 2.238 grams of ultrapure water were mixed and agitated for 3 minutes. Then, 0.068 gram of a binder PTFE or polytetrafluoroethylene (POLYFLON PEFE D-210C made by Daikin Industries Ltd.) was added to the resulting mixed solution and agitated for a further 3 minutes. The thus obtained slurry was coated on carbon paper (TGP-H-060 made by Toray Industries, Inc.), and vacuum dried at 110° C. for 15 hours. The thus obtained carbon paper were punched out to φ16 mm. There was an air electrode obtained in which Ketjen Black acting as a positive electrode reaction layer was applied on the carbon paper acting as a positive electrode collector. On the other hand, a lithium foil (φ16 mm, 0.2 mm thick) comprising a negative electrode active substance layer and a negative electrode collector was used as the metal negative electrode.

In a dry room (dried air) having a temperature of dew point temperature −50° C. or lower, the aforesaid air electrode and metal negative electrode and a glass fiber paper (Whatman (registered trademark) GF-A) that was a separator impregnated with the electrolytes of Examples 1 to 12 were assembled in a coin cell case (CR2032 model). It is here noted that prior to assembling, a plurality of small openings (φ1 mm) were provided through the coin cell case for absorption and desorption of air.

Figure 15:
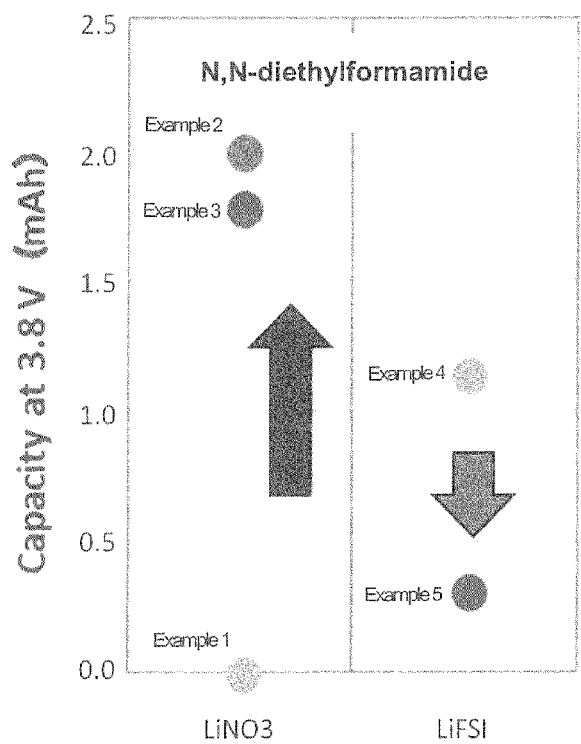
FIG. 15 is illustrative of capacity changes at 3.8 V upon charging of lithium air batteries comprising combinations of N, N-diethylformamide with various lithium salts.
Figure 16:
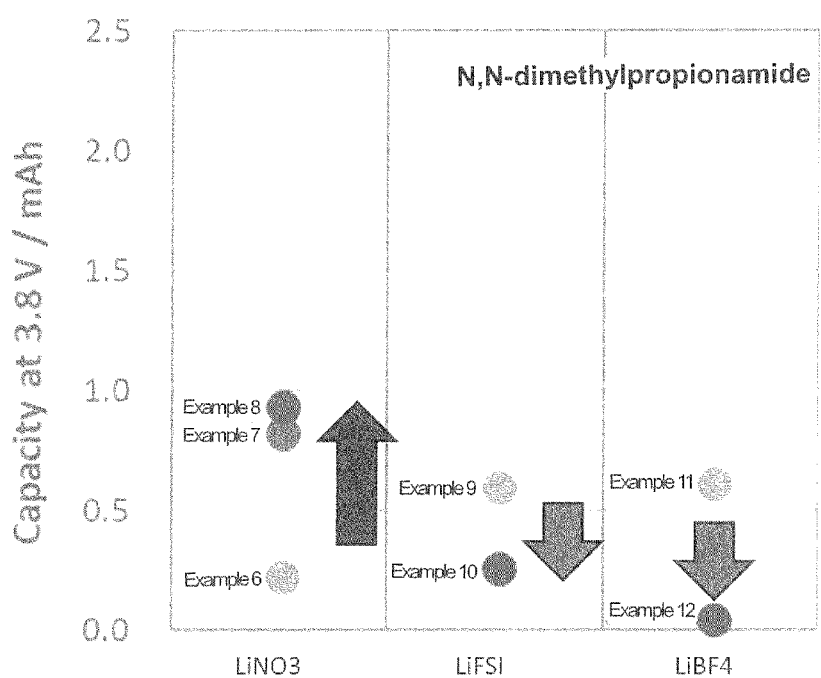
FIG. 16 is illustrative of capacity changes at 3.8 V upon charging of lithium air batteries including electrolytes comprising combinations of N, N-dimethylpropionamide with various lithium salts.

The cycle characteristics of the lithium air batteries obtained using the electrolytes of Examples 1 to 12 were estimated. More specifically, a cycle comprising 5-hour charge/5-hour discharge were repeated three times at a current value of 0.2 mA/cm$^2$ or 0.4 mA/cm$^2$ and a cutoff potential of 2V-4.5V under room temperature in an oxygen atmosphere. Used for this measurement was a charge/discharge tester (HJ1001SD8 made by Hokuto Denko Corporation). The results are set out in FIGS. 3 to 14. Capacities were also measured at 3.8 V during the first charge for comparative purposes. The results are shown in FIGS. 15 and 16 and in Table 2.

Figure 3:
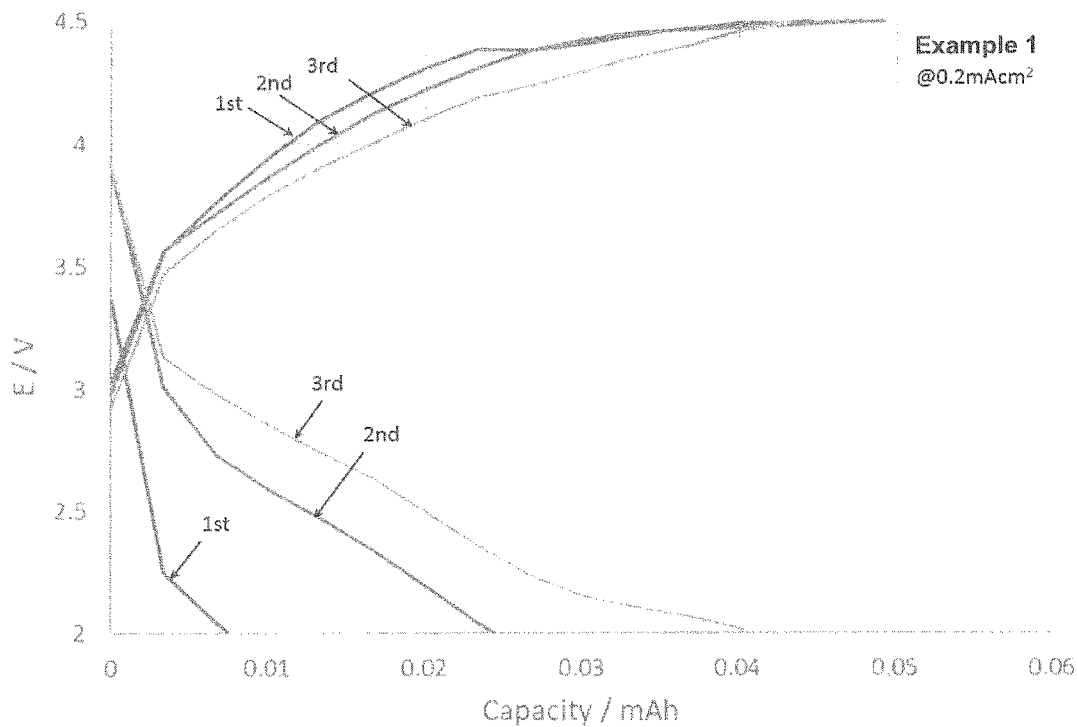
FIG. 3 is indicative of the charge/discharge cycle properties of the lithium air battery according to Example 1.

FIG. 3 is indicative of the charge/discharge cycle characteristics of the lithium air battery according to Example 1.

Figure 4:
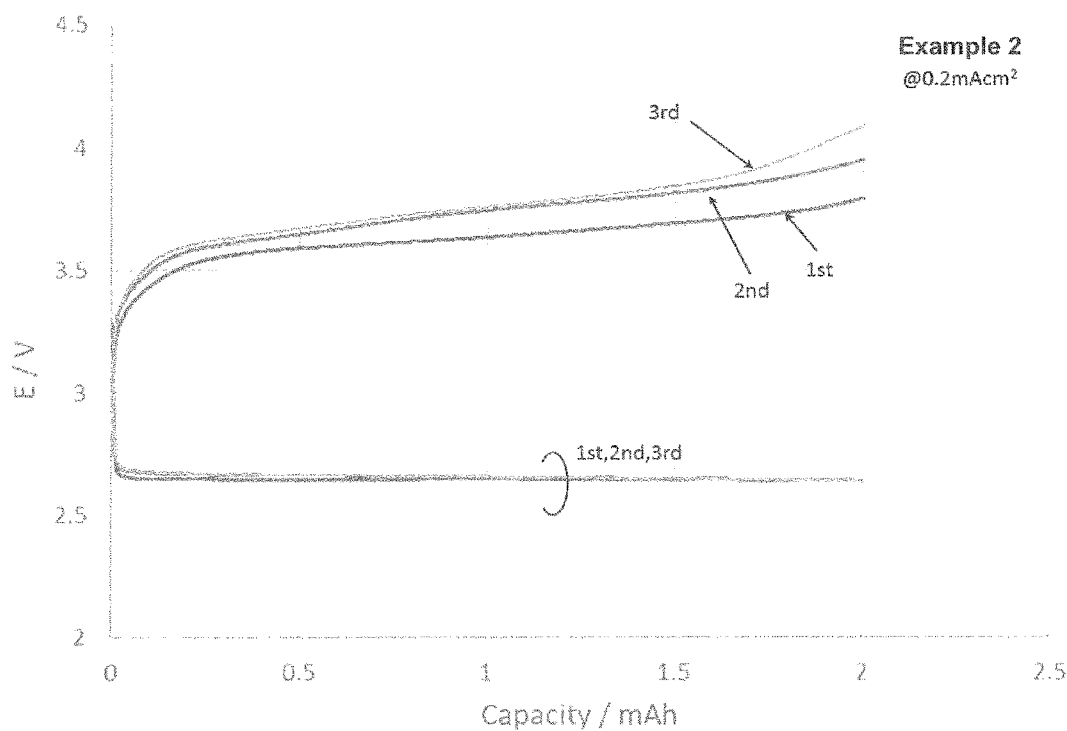
FIG. 4 is indicative of the charge/discharge cycle properties of the lithium air battery according to Example 2.

FIG. 4 is indicative of the charge/discharge cycle characteristics of the lithium air battery according to Example 2.

Figure 5:
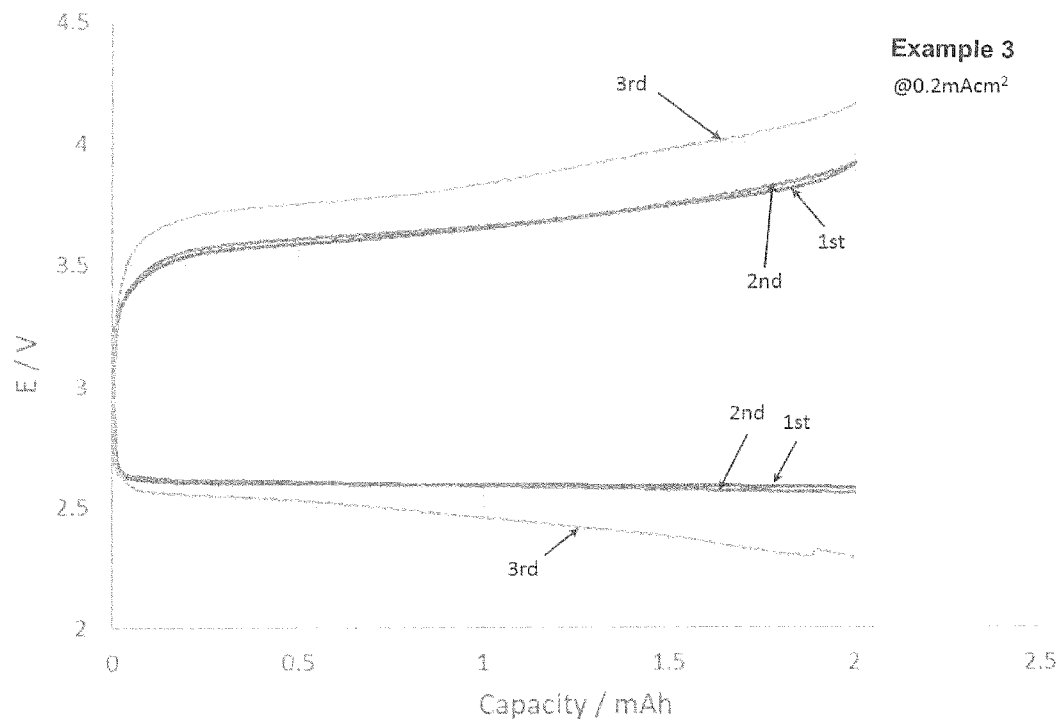
FIG. 5 is indicative of the charge/discharge cycle properties of the lithium air battery according to Example 3.

FIG. 5 is indicative of the charge/discharge cycle characteristics of the lithium air battery according to Example 3.

Figure 6:
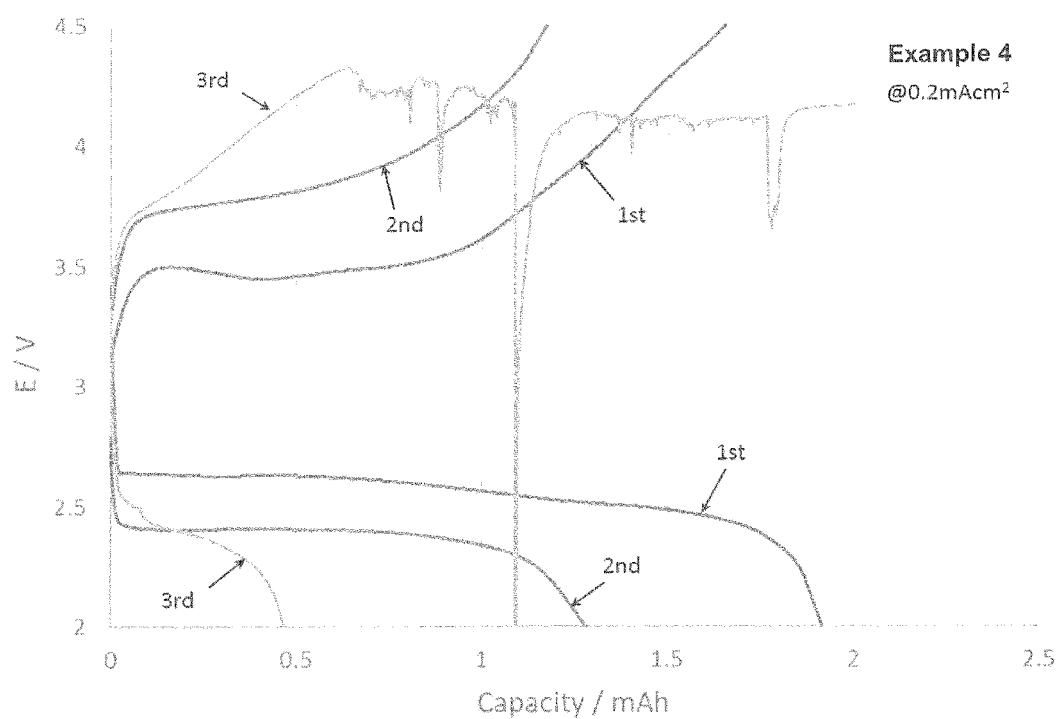
FIG. 6 is indicative of the charge/discharge cycle properties of the lithium air battery according to Example 4.

FIG. 6 is indicative of the charge/discharge cycle characteristics of the lithium air battery according to Example 4.

Figure 7:
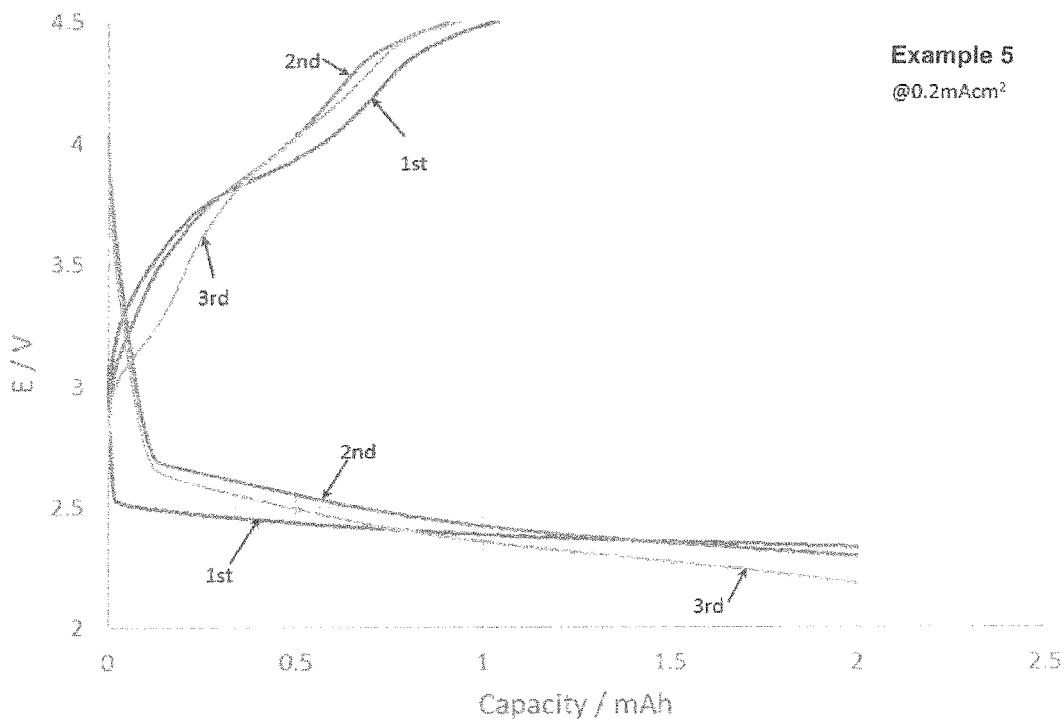
FIG. 7 is indicative of the charge/discharge cycle properties of the lithium air battery according to Example 5.

FIG. 7 is indicative of the charge/discharge cycle characteristics of the lithium air battery according to Example 5.

Figure 8:
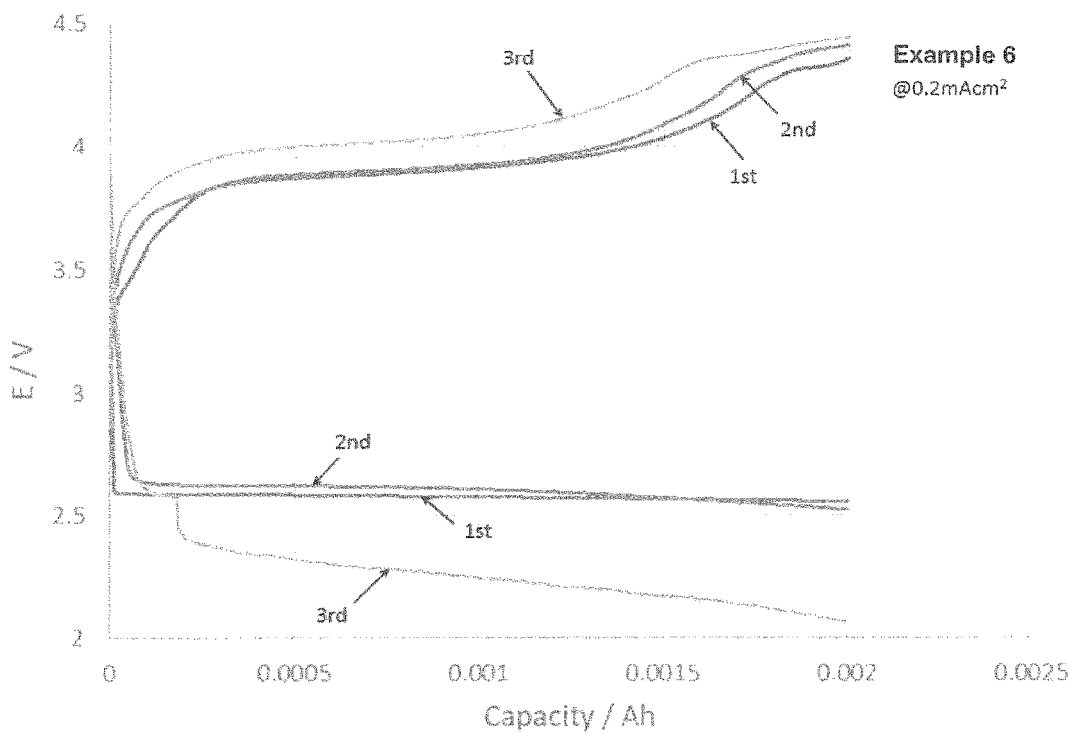
FIG. 8 is indicative of the charge/discharge cycle properties of the lithium air battery according to Example 6.

FIG. 8 is indicative of the charge/discharge cycle characteristics of the lithium air battery according to Example 6.

Figure 9:
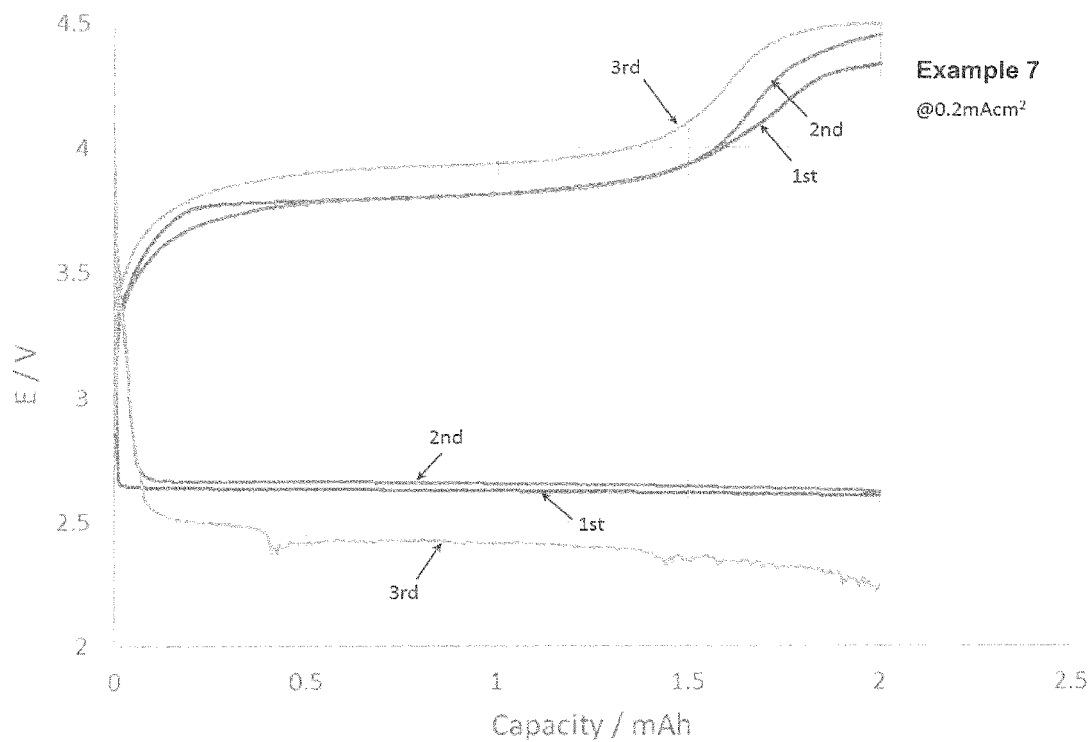
FIG. 9 is indicative of the charge/discharge cycle properties of the lithium air battery according to Example 7.

FIG. 9 is indicative of the charge/discharge cycle characteristics of the lithium air battery according to Example 7.

Figure 10:
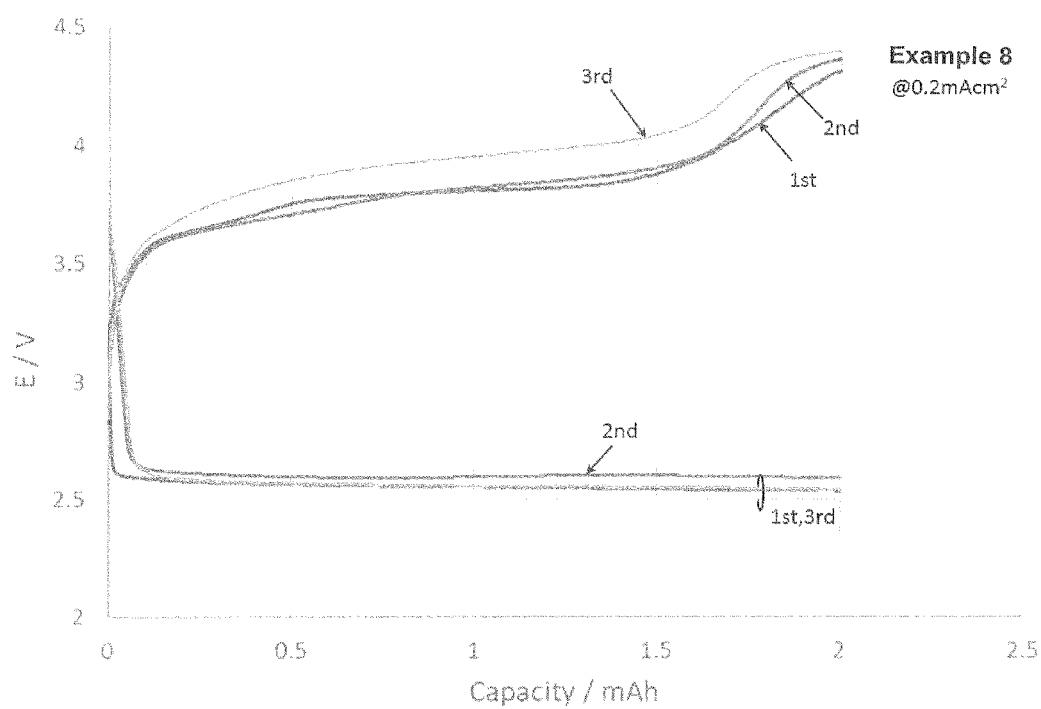
FIG. 10 is indicative of the charge/discharge cycle properties of the lithium air battery according to Example 8.

FIG. 10 is indicative of the charge/discharge cycle characteristics of the lithium air battery according to Example 8.

Figure 11:
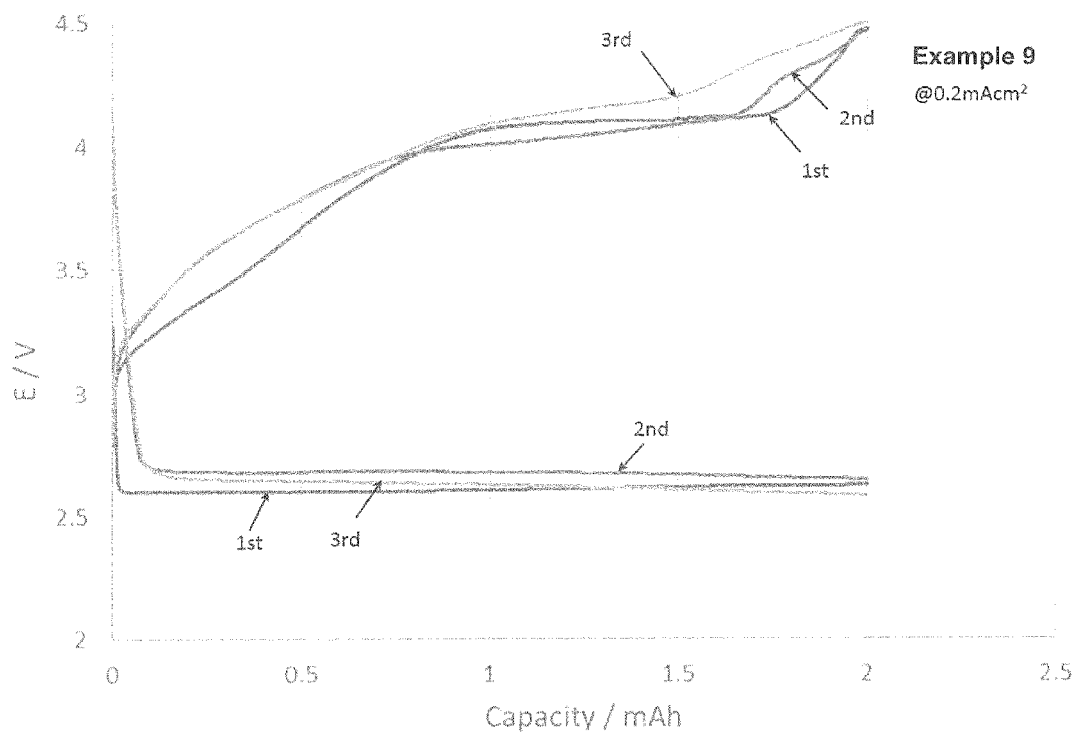
FIG. 11 is indicative of the charge/discharge cycle properties of the lithium air battery according to Example 9.

FIG. 11 is indicative of the charge/discharge cycle characteristics of the lithium air battery according to Example 9.

Figure 12:
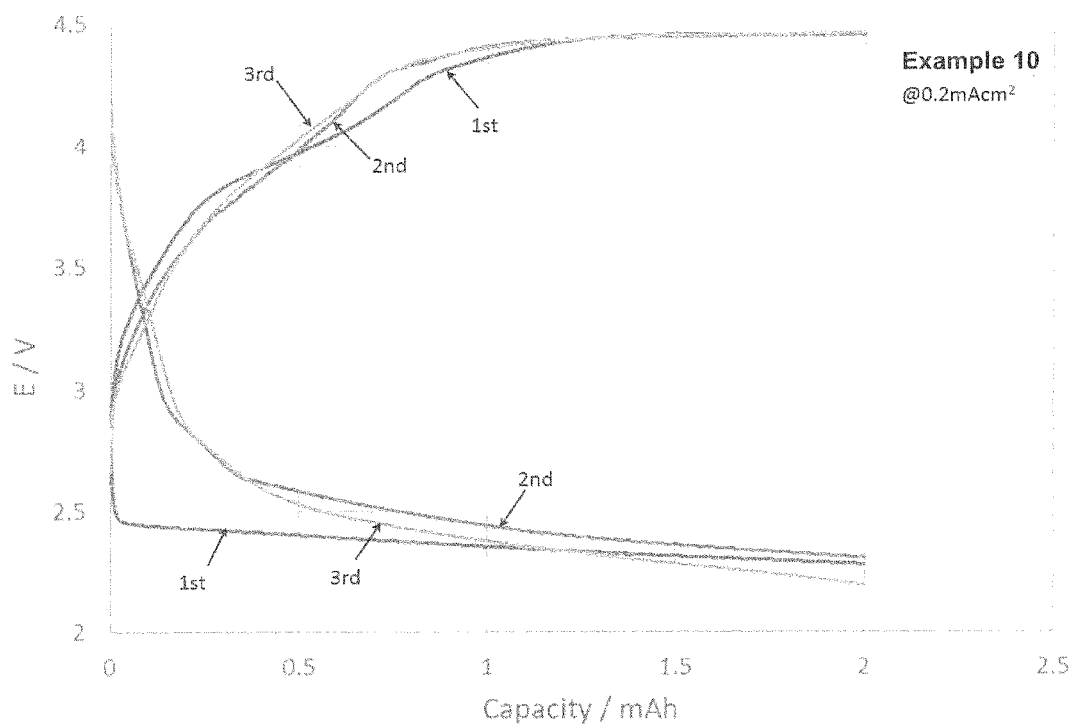
FIG. 12 is indicative of the charge/discharge cycle properties of the lithium air battery according to Example 10.

FIG. 12 is indicative of the charge/discharge cycle characteristics of the lithium air battery according to Example 10.

Figure 13:
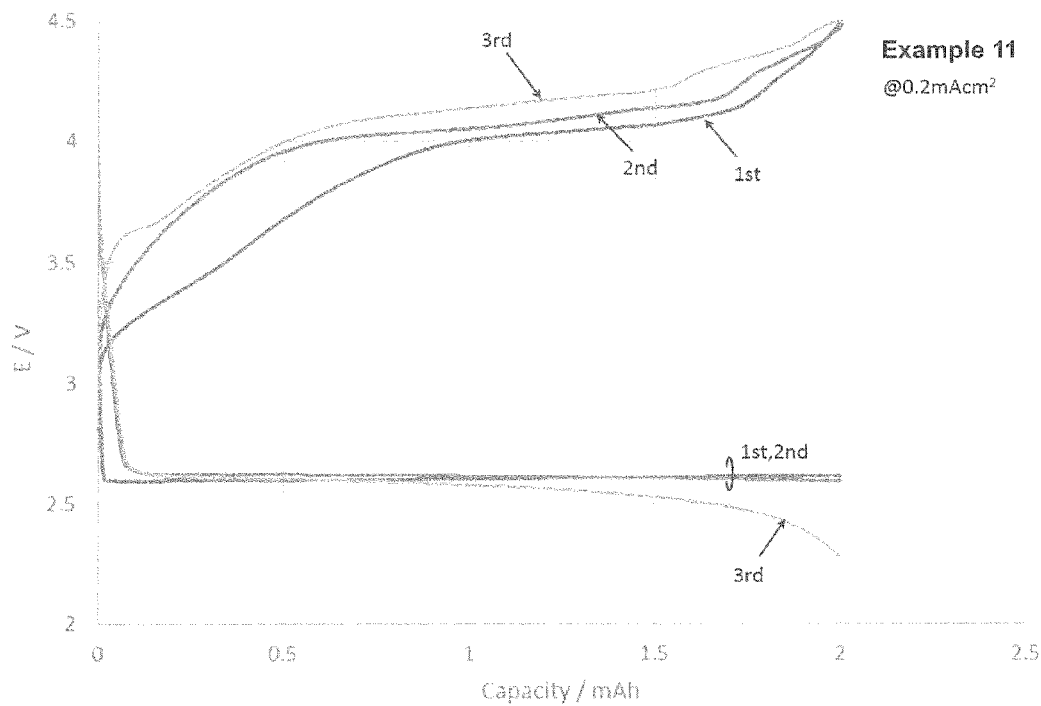
FIG. 13 is indicative of the charge/discharge cycle properties of the lithium air battery according to Example 11.

FIG. 13 is indicative of the charge/discharge cycle characteristics of the lithium air battery according to Example 11.

Figure 14:
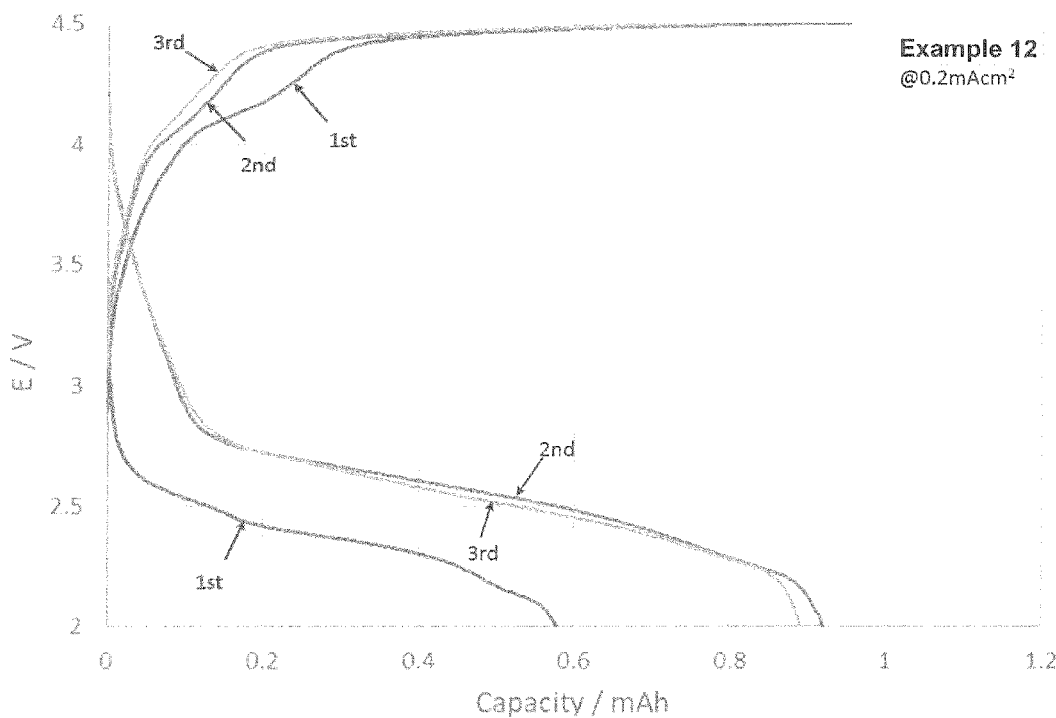
FIG. 14 is indicative of the charge/discharge cycle properties of the lithium air battery according to Example 12.

FIG. 14 is indicative of the charge/discharge cycle characteristics of the lithium air battery according to Example 12.

According to FIGS. 6 and 7, it has been found that the electrolyte comprising a combination of N, N-diethyl-formamide as the amide-based organic solvent with LiFSI as the lithium salt fails to have any constant charge/discharge cycle characteristics irrespective of lithium salt concentrations. According to FIGS. 3 to 5, on the other hand, it has been found that the electrolytes comprising a combination of N, N-diethyl-formamide as the amide-based organic solvent with lithium nitrate as the lithium salt have constant charge/discharge cycle characteristics, and it has surprisingly been found that as the lithium nitrate concentration increases, it holds back an increase in the voltage of the air electrode upon charge, resulting in enhancement of energy efficiency.

According to FIGS. 11 to 14, it has again been found that the electrolytes comprising a combination of N, N-dimethylpropionamide as the amide-based organic solvent with LiFSI or LiBF$_4$ as the lithium salt fail to have any constant charge/discharge cycle characteristics irrespective of lithium salt concentrations. According to FIGS. 8 to 10, on the other hand, it has been found that the electrolytes comprising a combination of N, N-dimethylpropionamide as the amide-based organic solvent with lithium nitrate as the lithium salt have constant charge/discharge cycle characteristics, and it has surprisingly been found that as the lithium nitrate concentration increases, it holds back an increase in the voltage of the air electrode upon charge, resulting in enhancement of energy efficiency.

TABLE 2

Listing of capacities at 3.8 V of air batteries (cell batteries) using the electrolytes of Examples 1 to 12

| Ex. | Amide-Based Organic Solvents | Supporting Salts Types | Conc. (mol/L) |
|---|---|---|---|
| 1 | N,N-diethylformamide | LiNO$_3$ | 1 |
| 2 | N,N-diethylformamide | LiNO$_3$ | 3 |
| 3 | N,N-diethylformamide | LiNO$_3$ | 5 |
| 4 | N,N-diethylformamide | LiFSI | 1 |
| 5 | N,N-diethylformamide | LiSFI | 5 |
| 6 | N,N-dimethylpropionamide | LiNO$_3$ | 1 |
| 7 | N,N-dimethylpropionamide | LiNO$_3$ | 3 |
| 8 | N,N-dimethylpropionamide | LiNO$_3$ | 5 |
| 9 | N,N-dimethylpropionamide | LiFSI | 1 |
| 10 | N,N-dimethylpropionamide | LiFSI | 5 |
| 11 | N,N-dimethylpropionamide | LiBF$_4$ | 1 |
| 12 | N,N-dimethylpropionamide | LiBF$_4$ | 5 |

| Example | Capacities at 3.8 V (mAh) |
|---|---|
| 1 | 0.007 |
| 2 | 2.0 |
| 3 | 1.791 |
| 4 | 1.15 |
| 5 | 0.32 |
| 6 | 0.237 |
| 7 | 0.833 |
| 8 | 0.947 |
| 9 | 0.613 |
| 10 | 0.270 |
| 11 | 0.627 |
| 12 | 0.057 |

FIG. 15 is indicative of capacity changes at 3.8 V upon charge in lithium air batteries obtained by use of electrolytes comprising combinations of various lithium salts with N, N-diethylformamide.

FIG. 16 is indicative of capacity changes at 3.8 V upon charge in lithium air batteries obtained by use of electrolytes comprising combinations of various lithium salts with N, N-dimethylpropionamide.

According to FIG. 15, it has been found that when N,N-diethylformamide is used as the amide-based organic solvent, the use of lithium nitrate as the lithium salt in a high concentration of no less than 2 mol/L to no greater than 5.5 mol/L, preferably of no less than 3 mol/L to no greater than 5 mol/L, results in enhancement of capacity. From the fact that when the lithium salt is LiFSI, there is behavior quite opposite to that occurring in the case of lithium nitrate, it has been found that an increased capacity associated with an increase in the lithium salt concentration is a specific phenomenon to lithium nitrate.

According to FIG. 16, it has been found, as in FIG. 15, that when N, N-dimethylpropionamide is used as the amide-based organic solvent, the use of lithium nitrate as the lithium salt in a high concentration of no less than 2 mol/L to no greater than 5.5 mol/L, preferably of no less than 3 mol/L to no greater than 5 mol/L results in enhancement of capacity, if not significant. It is here noted that from the tendency of capacity to become high in an increased lithium nitrate concentration, there will be a further enhancement of the overall capacity by further additive elements or the like. It has also been found that when the lithium salt is LiFSI or LiBF$_4$, there is behavior quite opposite to that occurring with lithium nitrate, indicating that an increased capacity associated with an increase in the lithium salt concentration is a specific phenomenon to lithium nitrate.

INDUSTRIAL APPLICABILITY

The electrolyte according to the invention disclosed herein is applied to a lithium air battery in order to improve its energy efficiency.

EXPLANATION OF THE REFERENCE NUMERALS

100, 200: Lithium Air Battery
110: Air Electrode
120: Metal Negative Electrode
130, 220: Electrolyte
140: Positive Electrode Reaction Layer
150: Positive Electrode Collector
160: Negative Electrode Active Substance Layer
170: Negative Electrode Collector
210: Separator

What is claimed is:

1. An electrolyte for lithium air batteries, consisting essentially of an amide-based organic solvent, wherein said amide-based organic solvent is N,N-diethylformamide and/or N,N-dimethylpropionamide, and
   lithium nitrate, wherein a concentration of said lithium nitrate in said amide-based organic solvent satisfies a range of no less than 3 mol/L to no greater than 5 mol/L.

2. The electrolyte according to claim 1, which has a viscosity of no less than 0.1 Pa·s to no greater than 10 Pa·s.

3. A lithium air battery comprising an air electrode, a metal negative electrode comprising a lithium metal, and a non-aqueous electrolyte positioned between said air electrode and said metal negative electrode, wherein said non-aqueous electrolyte is provided by the electrolyte according to claim 1.

4. The lithium air battery according to claim 3, wherein a separator is provided between said air electrode and said metal negative electrode,
   said non-aqueous electrolyte is provided between said metal negative electrode and said separator, and
   said non-aqueous electrolyte or an aqueous electrolyte is provided between the said air electrode and said separator.

* * * * *